United States Patent
Nakano et al.

(10) Patent No.: US 9,804,059 B2
(45) Date of Patent: Oct. 31, 2017

(54) TURBO ROTATIONAL FREQUENCY DETECTION DEVICE

(71) Applicant: HINO MOTORS, LTD., Hino-shi (JP)

(72) Inventors: Hitoshi Nakano, Tokyo (JP); Hideyo Iwama, Tokyo (JP)

(73) Assignee: HINO MOTORS, LTD., Hino-shi (JP)

(*) Notice: Subject to any disclaimer, the term of this patent is extended or adjusted under 35 U.S.C. 154(b) by 434 days.

(21) Appl. No.: 14/405,030

(22) PCT Filed: Jun. 24, 2013

(86) PCT No.: PCT/JP2013/003928
§ 371 (c)(1),
(2) Date: Dec. 2, 2014

(87) PCT Pub. No.: WO2014/002464
PCT Pub. Date: Jan. 3, 2014

(65) Prior Publication Data
US 2015/0143882 A1 May 28, 2015

(30) Foreign Application Priority Data
Jun. 27, 2012 (JP) ................................ 2012-143657

(51) Int. Cl.
*G01M 15/14* (2006.01)
*F02B 39/16* (2006.01)
(Continued)

(52) U.S. Cl.
CPC .............. *G01M 15/14* (2013.01); *F02B 39/16* (2013.01); *F02B 2037/122* (2013.01);
(Continued)

(58) Field of Classification Search
CPC ... G01M 15/14; F02B 39/16; F02B 2037/122; F02B 2039/168; F02D 2200/0414;
(Continued)

(56) References Cited

U.S. PATENT DOCUMENTS

| 6,234,144 B1* | 5/2001 | Yamaguchi ............... F01L 9/04 123/399 |
| 6,298,718 B1 | 10/2001 | Wang |
| 2012/0179356 A1 | 7/2012 | Ide et al. |

FOREIGN PATENT DOCUMENTS

| GB | 2 386 689 A | 9/2003 |
| JP | 5-10149 A | 1/1993 |

(Continued)

OTHER PUBLICATIONS

English Machine translation for JP 2011185263.*
International Search Report issued Jul. 30, 2013 in PCT/JP2013/003928 Filed Jun. 24, 2013.

*Primary Examiner* — Daniel S Larkin
*Assistant Examiner* — Anthony W Megna Fuentes
(74) *Attorney, Agent, or Firm* — Oblon, McClelland, Maier & Neustadt, L.L.P.

(57) ABSTRACT

Based on entry/exit pressures of a compressor detected by atmospheric/boost pressure sensors, a pressure ratio of compressor is calculated. Based on mass flow rate and entry temperature of intake air detected by intake air flow-rate/temperature sensors and entry pressure, a volumetric flow rate of intake air is calculated in environmental condition at a detection time using gas state equation, and is corrected into a volumetric flow rate under standard environmental condition thorough multiplication by a corrective coefficient based on entry temperature of intake air. Based on the corrected value and the calculated pressure ratio, a rotational frequency of compressor under standard environmental condition is read out in light of operating characteristic diagram for the compressor. Read-out rotational frequency is corrected into actual rotational frequency of the compressor through multiplication by a corrective coefficient based on entry temperature of intake air, which is determined as rotational frequency of turbocharger.

1 Claim, 3 Drawing Sheets

(51) Int. Cl.
    *F02D 41/18*     (2006.01)
    *F02D 41/00*     (2006.01)
    *F02B 37/12*     (2006.01)

(52) U.S. Cl.
    CPC .... *F02B 2039/168* (2013.01); *F02D 41/0007* (2013.01); *F02D 41/18* (2013.01); *F02D 2200/0402* (2013.01); *F02D 2200/0406* (2013.01); *F02D 2200/0414* (2013.01)

(58) Field of Classification Search
    CPC ......... F02D 41/0007; F02D 2200/0402; F02D 2200/0406; F02D 41/18
    USPC ................................ 73/112.05, 1.16, 114.77
    See application file for complete search history.

(56) References Cited

FOREIGN PATENT DOCUMENTS

| | | | |
|---|---|---|---|
| JP | 2006-022763 A | | 1/2006 |
| JP | 2006-029279 A | | 2/2006 |
| JP | 2006-057526 A | | 3/2006 |
| JP | 2009-180162 A | | 8/2009 |
| JP | 2011185263 A | * | 9/2011 ......... F02D 41/0007 |
| JP | 2013-053546 A | | 3/2013 |
| WO | WO 2011/099173 A1 | | 8/2011 |

* cited by examiner

TURBO ROTATIONAL FREQUENCY DETECTION DEVICE

TECHNICAL FIELD

The present invention relates to a turbo rotational frequency detection device.

BACKGROUND ART

In recent engine designing, a downsizing concept shifted from a conventional concept with a high regard to top performance is becoming mainstream. In progress is changeover to supercharged engines in which engine displacement and a number of cylinders are reduced by supercharging with a turbocharger to obtain an output and a torque equivalent to those of natural intake engines with a size larger than the supercharged ones.

For example, in diesel engines, V-twelve and -eight engines used to be prevailing in particular with respect to commercial vehicles (trucks). Now, supercharged straight-six and -four engines are becoming mainstream owing to the downsizing concept.

In association with such downsizing concept being becoming main stream, further compactification in size of turbochargers has been demanded, which makes it difficult to arrange a rotation sensor at a bearing portion between a turbine and a compressor of a turbocharger as ever.

Specifically, in the conventional rotation sensor, a disc with a circumferential notch is integrally fitted over a rotary shaft interconnecting the turbine and the compressor of the turbocharger. Arranged adjacent to the disc is a non-contact sensor which grasps passing of the notch of the disc as, for example, change in a magnetic field so that the passing of the notch of the disc is detected and counted by the sensor, whereby a rotational frequency of the turbocharger can be monitored. However, cases increase where no spatial room is left between the turbine and the compressor due to pipings of, for example, cooling water and lubrication oil so that the disc and the non-contact sensor cannot be physically arranged.

There exists, for example, the following Patent Literature 1 as conventional art document pertinent to the invention.

CITATION LIST

Patent Literature

[Patent Literature 1] JP 2006-057526A

SUMMARY OF INVENTION

Technical Problems

In a turbocharger where no rotation sensor can be arranged to monitor a rotational frequency of the turbocharger, overrun with excessive rotational velocity beyond a limit velocity cannot be detected so that the turbocharger may overrun into breakage. Especially in usage at highland or the like where overrun tends to occur due to lowered air density resulting from barometric depression, there may be cases where an output of an engine has to be lowered to suppress the rotational frequency.

The invention was made in view of the above and has its object to provide a turbo rotational frequency detection device capable of determining a rotational frequency of a turbocharger without a rotation sensor.

Solution to Problems

The invention is directed to a turbo rotational frequency detection device comprising first and second pressure sensors for detecting entry and exit pressures of a compressor, respectively, intake flow rate and temperature sensors for detecting a mass flow rate and an entry temperature of intake air, respectively, and an arithmetic device for digitally storing an operating characteristic diagram showing equal rotational frequency lines of the compressor in a turbocharger in terms of a volumetric flow rate of the intake air and a pressure ratio under a standard environmental condition where the entry pressure of the compressor and the entry temperature of the intake air are predetermined standard values, said arithmetic device being adapted to calculate a pressure ratio of said compressor on the basis of the entry and exit pressures of the compressor detected by the first and second pressure sensors, respectively, and calculate a volumetric flow rate of the intake air under an environmental condition at a time of detection using a gas state equation on the basis of the mass flow rate and the entry temperature of the intake air detected by the intake flow rate and temperature sensors, respectively, and said entry pressure of the compressor, correct the calculated volumetric flow rate into a volumetric flow rate under said standard environmental condition through multiplication by a corrective coefficient based on said entry temperature, read out a rotational frequency under the standard environmental condition on the basis of the corrected volumetric flow rate and said calculated pressure ratio and in light of said operating characteristic diagram, correct the read-out rotational frequency into an actual rotational frequency of the compressor through multiplication by the corrective coefficient based on the entry temperature of the intake air and determine the actual rotational frequency as a rotational frequency of the turbocharger.

Specifically, a compressor in general has a characteristic that if a pressure ratio (ratio of entry and exit pressures) of the compressor rotated at a rotational frequency is determined, a volumetric flow rate of intake air in the compressor is unambiguously determined, so that experimentally obtained equal rotational frequency lines can be plotted on a graph with an ordinate representing a pressure ratio and an abscissa representing a volumetric flow rate of the intake air. On the basis of an operating characteristic diagram (compressor map) in the form of such graph, a rotational frequency can be read out from the pressure ratio and the volumetric flow rate.

However, the above-mentioned operating characteristic diagram comes into effect under an environmental condition with a single entry temperature and a single entry pressure; even if the intake air has the same mass flow rate, the volumetric flow rate may become greater due to expansion provided that the entry temperature becomes higher or the entry pressure becomes lower. Thus, it is necessary to determine a standard environmental condition where an entry pressure of the compressor and an entry temperature of the intake air have predetermined standard values and use as a standard a volumetric flow rate under the standard environmental condition.

Thus, even if the pressure ratio of the compressor is calculated on the basis of the entry and exit pressures of the compressor detected by first and second pressure sensors, respectively, and the volumetric flow rate of the intake air under an environmental condition at a time of detection is calculated using a gas state equation on the basis of the mass flow rate and the entry temperature of the intake air detected by intake flow rate and temperature sensors, respectively, and the entry pressure of the compressor, a rotational frequency cannot be read out from the operating characteristic diagram stored in an arithmetic device since the calculated volumetric flow rate is not standardized.

Then, the calculated volumetric flow rate is corrected into a corrected volumetric flow rate under the standard environmental condition through multiplication by the corrective coefficient on the basis of the entry temperature of the intake air. On the basis of the corrected volumetric flow rate and the calculated pressure ratio, a rotational frequency of the compressor under the standard environmental condition can be read out in light of the operating characteristic diagram.

In the correction of the calculated volumetric flow rate into the corrected volumetric flow rate under the standard environmental condition through multiplication by the corrective coefficient based on the entry temperature of the intake air, usable as the corrective coefficient is a square root of a quotient obtained through division of the entry temperature (absolute temperature detected by the intake temperature sensor) at the time of detection by the entry temperature (absolute temperature) under the standard environmental condition. The multiplication by such corrective coefficient enables the correction into the volumetric flow rate under the standard environmental condition, which is due to gas similarity rule.

However, the rotational frequency read out in light of the operating characteristic diagram is the rotational frequency of the compressor under the standard environmental condition and is different from an actual rotational frequency. Thus, the read-out rotational frequency is converted into the actual rotational frequency of the compressor through multiplication by the corrective coefficient based on the entry temperature of the intake air, the converted value being determined as the rotational frequency of the turbocharger.

In the conversion of the value read out from the operating characteristic diagram into the actual rotational frequency of the compressor through multiplication by the corrective coefficient based on the entry temperature of the intake air, usable as the corrective coefficient is a square root of a quotient obtained through division of the entry temperature (absolute temperature detected by the intake temperature sensor) at the time of detection by the entry temperature (absolute temperature) under the standard environmental condition. The multiplication by such corrective coefficient enables the correction into the actual volumetric flow rate, which is due to gas similarity rule.

Further, it is preferable in the invention that the arithmetic device is adapted to determine overrun of the turbocharger when the rotational frequency of the turbocharger is detected to exceed a predetermined threshold over a predetermined time period or more. This makes it possible to monitor the rotational frequency of the turbocharger so as to determine the overrun and prevent beforehand the turbocharger from being broken.

Advantageous Effects of Invention

Excellent effects can be obtained according to the above-mentioned turbo rotational frequency detection device of the invention. Without a rotation sensor at a bearing portion between a turbine and a compressor of a turbocharger, a rotational frequency of the turbocharger can be determined by physical calculations on the basis of entry and exit pressures of the compressor and mass flow rate and entry temperature of intake air. Thus, even in the turbocharger with no spatial room for arrangement of the rotation sensor, the rotational frequency thereof can be monitored to prevent the turbocharger from being broken due to overrun. Moreover, even in a turbocharge with spatial room for arrangement of the rotation sensor, substantial reduction in cost may be attained by omitting the rotation sensor.

DESCRIPTION OF EMBODIMENT

An embodiment of the invention will be described in conjunction with the drawings.

Figure 1:
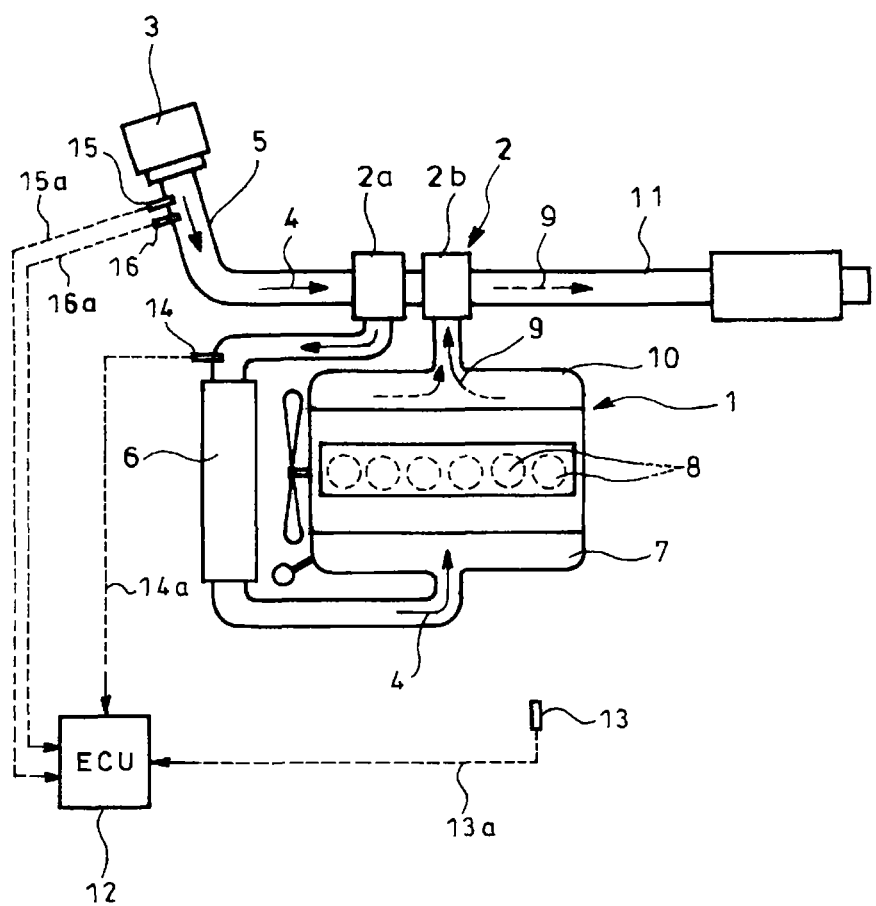
FIG. 1 is a schematic view showing an embodiment of the invention.

FIG. 1 shows the embodiment of the invention. In FIG. 1, reference numeral 1 denotes an engine with a turbocharger 2 having a compressor 2a to which fed is intake air 4 from an air cleaner 3 through an intake pipe 5. The intake air 4 thus pressurized in the compressor 2a is fed to an intercooler 6 where it is cooled. The cooled intake air 4 from the intercooler 6 is further guided to an intake manifold 7 and distributed into each of cylinders 8 in the engine 1.

Exhaust gas 9 discharged from each of the cylinders 8 in the engine 1 is fed via an exhaust manifold 10 to a turbine 2b of the turbocharger 2. The exhaust gas 9 thus having driven the turbine 2b is discharged through an exhaust pipe 11 to outside of the vehicle.

Further, arranged at an appropriate site in an engine compartment less affected by aerodynamic drag is an atmospheric pressure sensor 13 (first pressure sensor) for detecting of an atmospheric pressure as an entry pressure of a compressor 2a. Arranged in an intake pipe 5 between the compressor 2a and the intercooler 6 is a boost pressure sensor 14 for detection of an exit pressure of the compressor 2a. Arranged in the intake pipe 5 upstream of the compressor 2a at a position adjacent to the air cleaner 3 are an intake flow rate sensor 15 (air flow meter) for detection of a mass flow rate of the intake air 4 and an intake temperature sensor 16 for detection of an entry temperature of the intake air 4.

Here, for convenience of explanation, the intake flow rate and temperature sensors 15 and 16 are separately disclosed. However, actually a temperature of the intake air 4 (fresh air) is required for determining a mass flow rate of the intake air 4, so that usually the intake temperature sensor 16 is built in the intake flow rate sensor 15.

Figure 2:
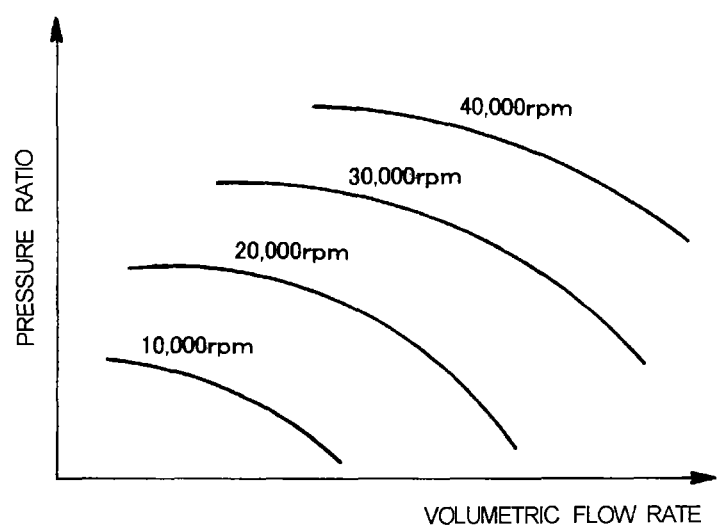
FIG. 2 is an operating characteristic diagram digitally stored in the controller in FIG. 1.

Detection signals 13a, 14a, 15a and 16a from the atmospheric pressure sensor 13, the boost pressure sensor 14, the intake flow rate sensor 15 and the intake temperature sensor 16 are inputted to a controller 12 (arithmetic device) constituting an engine control computer (ECU: Electronic Control Unit). Digitally stored in the controller 12 is an operating characteristic diagram (see FIG. 2) for equal rotational frequency lines of the compressor 2a in the turbocharger 2 represented by a volumetric flow rate of the intake air 4 and a pressure ratio under a standard environmental condition where an entry pressure of the compressor 2a and an entry temperature of the intake air 4 are predetermined standard values.

Illustrated is a case where the single turbocharger 2 is used, the standard environmental condition being such that the entry pressure of the compressor 2 is 1 atm (standard atmospheric pressure) corresponding to an atmospheric pressure and the entry temperature of intake air 4 is 293K (20° C.). As usual existing facilities, atmospheric and boost pressure sensors 13 and 14 are used as first and second pressure sensors for detection of entry and exit pressures of the compressor 2a, respectively, and the intake temperature sensor 16 built in the intake flow rate sensor 15 is used as an intake temperature sensor for detecting an entry temperature of the intake air 4.

However, in a multi-stage supercharging system having a plurality stages of turbochargers 2, each of the second and further turbochargers 2 must have additional first and second pressure sensors for detection of entry and exit pressures of its compressor 2a as well as an additional intake temperature sensor for detection of entry temperature of the intake air 4. However, there is no specific difference between single- and multi-stage supercharging systems with respect to a below-mentioned proceeding for determining a rotational frequency of turbocharger 2, using the controller 12.

Figure 3:
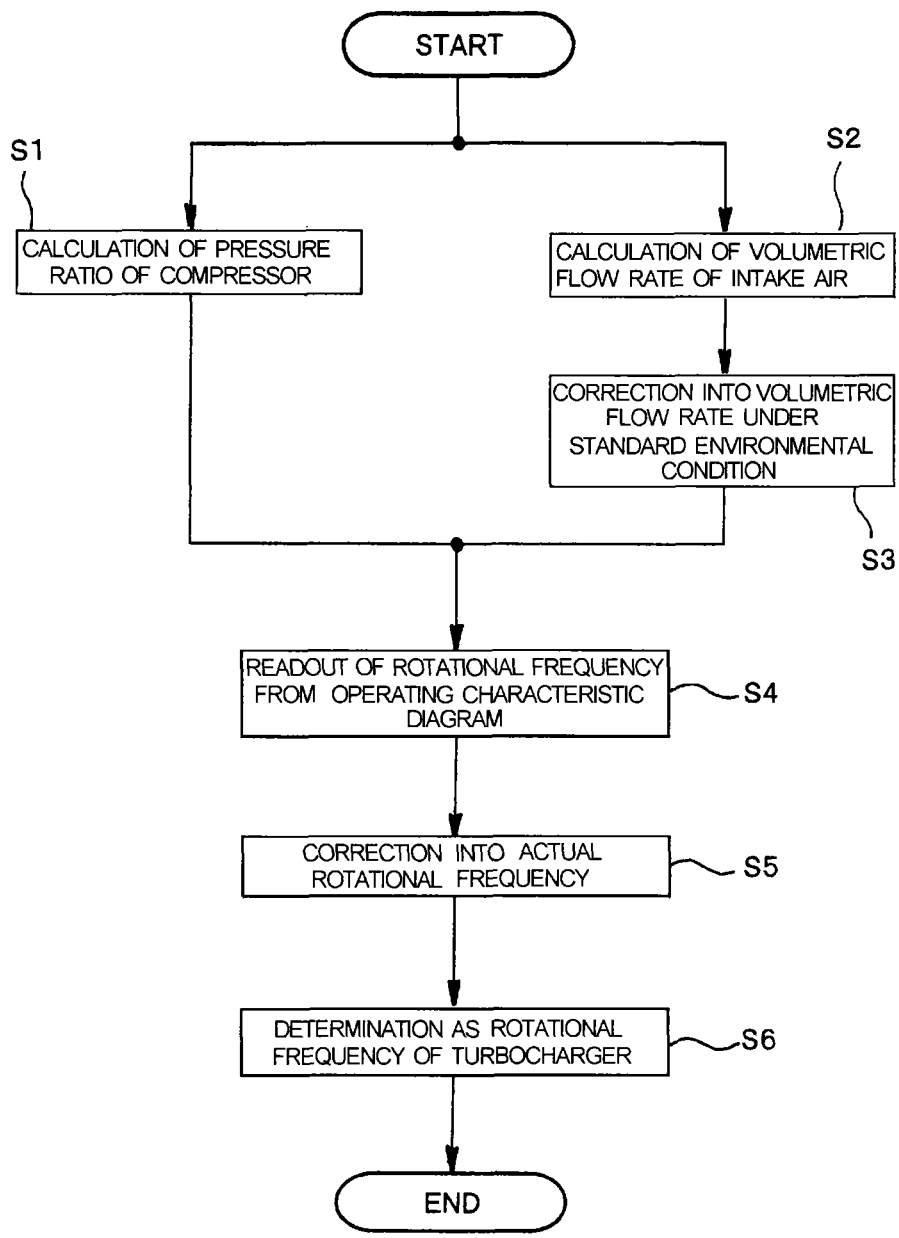
FIG. 3 is a flowchart of a proceeding for determining a rotational frequency of a turbocharger in FIG. 1.

FIG. 3 shows, in flowchart, the proceeding for determining the rotational frequency of turbocharger 2, using the controller 12. In the controller 12, calculated firstly in step S1 on the basis of the entry pressure (atmospheric pressure) and the exit pressure (boost pressure) of the compressor 2a detected by the atmospheric and boost pressure sensors 13 and 14, respectively, is the pressure ratio of the compressor 2a according to the following equation (1).

$$\text{pressure ratio } \pi_c = \text{exit pressure/entry pressure} \quad (1)$$

In parallel with step S1, calculated in step S2 using a gas state equation on the basis of the mass flow rate and the entry temperature of the intake air 4 detected by the intake flow rate and temperature sensors 15 and 16, respectively, and the entry pressure is the volumetric flow rate of the intake air 4 under an environmental condition at a time of detection. In a next step S3, the calculated volumetric flow rate is corrected into a corrected volumetric flow rate under the standard environmental condition through multiplication by a corrective coefficient based on the entry temperature of the intake air 4.

The steps S2 and S3 may be conducted concurrently according to the following equation (2). In the equation (2), the gas state equation (PV=gRT where P denotes pressure of the gas; V, volumetric flow rate of the gas; g, mass flow rate of the gas; R, gas constant; and T, temperature of the gas) is converted into a shape for obtaining the volumetric flow rate V and multiplied by the corrective coefficient based on the entry temperature T of the intake air 4. Here, used as the corrective coefficient is a square root of a quotient obtained by dividing the entry temperature 293K (absolute temperature) at the standard environmental condition with the entry temperature T (absolute temperature detected by the intake temperature sensor 16) at the time of detection. The equation is simplified by taking the temperature T used in the gas state equation into the root in the corrective coefficient equation. The multiplication by such corrective coefficient enables the correction into volumetric flow rate under the standard environmental condition, which is due to gas similarity rule.

$$\text{corrected value } Q_{a293} \text{ of the volumetric flow rate}$$
$$V = (\text{mass flow rate } g \times \text{gas constant } R)/\text{entry pressure } P \times \sqrt{(293 \times \text{entry temperature } T)} \quad (2)$$

Then, read out in a next step S4 on the basis of the corrected value $Q_{a293}$ of the volumetric flow rate and the calculated pressure ratio $\pi_c$ (obtained in step S1) and in light of the operating characteristic diagram (see FIG. 2) is a rotational frequency $N_{t293}$ of the compressor 2a under the standard environmental condition. Further, the read-out rotational frequency $N_{t293}$ is corrected in a next step S5 into an actual rotational frequency $N_t$ of the compressor 2a through multiplication by the corrective coefficient based on the entry temperature T of the intake air 4. The corrected value $N_t$ is determined in a next step S6 as the rotational frequency of the turbocharger 2.

Here, the operating characteristic diagram used in step S4 is digitally stored as function program in the controller 12. By inputting the corrected value $Q_{a293}$ of the volumetric flow rate and the calculated pressure ratio $\pi_c$, a rotational frequency $N_{t293}$ is calculated through the function program.

Further, the corrective coefficient used in step S5 is the square root of the quotient obtained by dividing the entry temperature T (absolute temperature detected by the intake temperature sensor 16) at the time of detection with the entry temperature 293K (absolute temperature) under the standard environmental condition. More specifically, the rotational frequency $N_{t293}$ is corrected into the actual rotational frequency $N_t$ according to the following equation (3). The multiplication of such corrective coefficient enables correction into the actual rotational frequency of the compressor 2a, which is due to the gas similarity rule.

$$\text{rotational frequency } N_t = \text{rotational frequency } N_{t293} \times \sqrt{(\text{entry temperature } T/293)} \quad (3)$$

Such proceeding for determining the rotational frequency of the turbocharger 2 in the controller 12 will be amplified. The compressor 2a in general has a characteristic that when the pressure ratio (ratio of entry and exit pressures) of the compressor rotated at a rotational frequency is determined, the volumetric flow rate of the intake air 4 in the compressor 2a is unambiguously determined, so that experimentally obtained equal rotational frequency lines can be plotted on the graph with the ordinate representing a pressure ratio and the abscissa representing a volumetric flow rate of the intake air 4. On the basis of the operating characteristic diagram (compressor map: see FIG. 2) in the form of such graph, a rotational frequency can be read out from the pressure ratio and the volumetric flow rate.

However, the above-mentioned operating characteristic diagram comes into effect under an environmental condition with a single entry temperature and a single entry pressure; even if the intake air 4 has the same mass flow rate, the volumetric flow rate may become greater due to expansion provided that the entry temperature becomes higher or the entry pressure becomes lower. Thus, it is necessary to determine a standard environmental condition where the entry pressure of the compressor 2a and the entry temperature of the intake air 4 have predetermined standard values and use as a standard a volumetric flow rate under the standard environmental condition.

Thus, even if the pressure ratio of the compressor 2a is calculated on the basis of entry and exit pressures of the compressor 2a detected by the atmospheric and boost pressure sensors 13 and 14, respectively, and the volumetric flow rate of the intake air 4 under the environmental condition at the time of detection is calculated using the gas state equation on the basis of the mass flow rate and the entry temperature of the intake air 4 detected by intake flow rate and temperature sensors 15 and 16, respectively, and the entry pressure of the compressor, the rotational frequency cannot be read out from the operating characteristic diagram under the standard environmental condition stored in the controller 12 since the calculated volumetric flow rate is not standardized.

Then, the calculated volumetric flow rate is corrected into a corrected volumetric flow rate under the standard environmental condition through multiplication by the corrective coefficient on the basis of the entry temperature of the intake air 4. On the basis of the corrected volumetric flow rate and the calculated pressure ratio, the rotational frequency of the compressor 2a under the standard environmental condition can be read out in light of the operating characteristic diagram.

However, the rotational frequency read out in light of the operating characteristic diagram is a rotational frequency of the compressor 2a under the standard environmental condition and is different from an actual rotational frequency. Thus, the read-out rotational frequency is converted into the actual rotational frequency of the compressor 2a through multiplication by the corrective coefficient based on the entry temperature of the intake air 4, the converted value being determined as the rotational frequency of the turbocharger 2.

In this case, it is preferable that the controller 12 is adapted to determine overrun of the turbocharger 2 when the rotational frequency of the turbocharger 2 is detected to exceed a predetermined threshold over a predetermined time period. This makes it possible to monitor the rotational frequency of the turbocharger 2 so as to determine the overrun and prevent beforehand the turbocharger 2 from being broken.

Thus, according to the above-mentioned embodiment, without a rotation sensor at the bearing portion between the turbine 2b and the compressor 2a of the turbocharger 2, the rotational frequency of the turbocharger 2 can be determined by the physical calculations on the basis of the entry and exit pressures of the compressor 2a and the mass flow rate and the entry temperature of the intake air 4. Thus, even in the turbocharger 2 with no spatial room for arrangement of the rotation sensor, the rotational frequency thereof can be monitored to prevent the turbocharger 2 from being broken due to overrun. Moreover, even in the turbocharger 2 with spatial room for arrangement of the rotation sensor, substantial reduction in cost may be attained by omitting the rotation sensor.

It is to be understood that a turbo rotational frequency detection device according to the invention is not limited to the above embodiment and that various changes and modifications may be made without departing from the scope of the invention.

REFERENCE SIGNS LIST 2 turbocharger
2a compressor
4 intake air
12 controller (arithmetic device)
13 atmospheric pressure sensor (first pressure sensor)
14 boost pressure sensor (second pressure sensor)
15 intake flow rate sensor
16 intake temperature sensor

The invention claimed is:

1. A turbo rotational frequency detection device, comprising:

first and second pressure sensors for detecting entry and exit pressures of a compressor, respectively, intake flow rate and temperature sensors for detecting a mass flow rate and an entry temperature of intake air, respectively, and an arithmetic device for digitally storing an operating characteristic diagram showing equal rotational frequency lines of the compressor in a turbocharger based on a volumetric flow rate of the intake air and a pressure ratio under a standard environmental condition where the entry pressure of the compressor and the entry temperature of the intake air are predetermined standard values, said arithmetic device calculating a pressure ratio of said compressor on the basis of the entry and exit pressures of the compressor detected by the first and second pressure sensors, respectively, and calculating a volumetric flow rate of the intake air under an environmental condition at a time of detection using a gas state equation on the basis of the mass flow rate and the entry temperature of the intake air detected by the intake flow rate and temperature sensors, respectively, and said entry pressure of the compressor, correcting the calculated volumetric flow rate into a volumetric flow rate under said standard environmental condition through multiplication by a corrective coefficient based on said entry temperature, reading out a rotational frequency under the standard environmental condition on the basis of the corrected volumetric flow rate and said calculated pressure ratio and in light of said operating characteristic diagram, correcting the read-out rotational frequency into an actual rotational frequency of the compressor through multiplication by the corrective coefficient based on the entry temperature of the intake air and determine the actual rotational frequency as a rotational frequency of the turbocharger, wherein said arithmetic device determines overrun of the turbocharger when the rotational frequency of the turbocharger is detected to exceed a predetermined threshold over a predetermined time period.

* * * * *